(12) United States Patent
Neukirch et al.

(10) Patent No.: US 9,623,696 B2
(45) Date of Patent: Apr. 18, 2017

(54) COMPOSITION FOR DEVELOPING A VISUALLY DISCERNIBLE COLOUR AND CORRESPONDING HEAT-SENSITIVE RECORDING MATERIAL

(71) Applicant: MITSUBISHI HITEC PAPER EUROPE GMBH, Bielefeld (DE)

(72) Inventors: Matthias Neukirch, Flensburg (DE); Nora Wilke nee Petersen, Kropp (DE)

(73) Assignee: Mitsubishi HiTec Paper Europe GmbH, Bielefeld (DE)

( * ) Notice: Subject to any disclaimer, the term of this patent is extended or adjusted under 35 U.S.C. 154(b) by 0 days.

(21) Appl. No.: 14/779,469

(22) PCT Filed: Feb. 25, 2014

(86) PCT No.: PCT/EP2014/053592
§ 371 (c)(1),
(2) Date: Sep. 23, 2015

(87) PCT Pub. No.: WO2014/154419
PCT Pub. Date: Oct. 2, 2014

(65) Prior Publication Data
US 2016/0031254 A1   Feb. 4, 2016

(30) Foreign Application Priority Data
Mar. 27, 2013   (EP) ..................... 13161436

(51) Int. Cl.
*B41M 5/327*   (2006.01)
*B41M 5/333*   (2006.01)
*B41M 5/32*    (2006.01)
*C09B 11/24*   (2006.01)
*B41M 5/337*   (2006.01)

(52) U.S. Cl.
CPC ............. *B41M 5/3331* (2013.01); *B41M 5/32* (2013.01); *B41M 5/3275* (2013.01); *B41M 5/333* (2013.01); *B41M 5/3333* (2013.01); *B41M 5/3335* (2013.01); *B41M 5/3375* (2013.01); *B41M 5/3377* (2013.01); *C09B 11/24* (2013.01); *B41M 2205/04* (2013.01)

(58) Field of Classification Search
CPC .... B41M 5/327; B41M 5/3275; B41M 5/333; B41M 5/3333; B41M 5/3335; B41M 2205/04
USPC ................... 503/200–226; 106/31.17, 31.22; 427/150
See application file for complete search history.

(56) References Cited

U.S. PATENT DOCUMENTS

| | | |
|---|---|---|
| 5,240,897 A | 8/1993 | Braun et al. |
| 6,017,848 A | 1/2000 | Mando et al. |
| 2005/0282704 A1 | 12/2005 | Kalishek et al. |
| 2011/0028317 A1 | 2/2011 | Stork et al. |

FOREIGN PATENT DOCUMENTS

| | | |
|---|---|---|
| EP | 0 432 091 | 6/1991 |
| EP | 0 899 126 | 3/1999 |
| EP | 2 279 877 | 2/2011 |

*Primary Examiner* — Bruce H Hess
(74) *Attorney, Agent, or Firm* — Cozen O'Connor

(57) ABSTRACT

A composition for forming a visually discernible color, the use of this composition for producing a heat-sensitive recording material, the corresponding heat-sensitive recording material includes a substrate and this composition, and a process for producing the heat-sensitive recording material.

17 Claims, No Drawings

COMPOSITION FOR DEVELOPING A VISUALLY DISCERNIBLE COLOUR AND CORRESPONDING HEAT-SENSITIVE RECORDING MATERIAL

PRIORITY CLAIM

This is a U.S. national stage of application No. PCT/EP2014/053592, filed on Feb. 25, 2014. Priority is claimed on the following application(s): Country: Europe, Application No.: 13161436.4, Filed: Mar. 27, 2013, the content of which is/are incorporated herein by reference in its entirety.

FIELD OF THE INVENTION

The present invention is directed to (i) a composition for forming a visually discernible color, (ii) the use of this composition for producing a heat-sensitive recording material, (iii) the corresponding heat-sensitive recording material comprising a substrate and this composition, and (iv) a process for producing the heat-sensitive recording material.

BACKGROUND OF THE INVENTION

Heat-sensitive recording materials have been known since the early years of chemically reactive recording materials and have enjoyed a steadily increasing popularity. This may be explained in part by the fact that the use of such heat-sensitive recording materials is associated with great commercial advantages. Due to the fact that the color-forming components are found in the heat-sensitive recording material itself, the production of a heat-induced recording (heat-induced print image, also referred to hereinafter as thermal print) is carried out on a heat-sensitive recording material of this type by means of printers which operate without toner or ink cartridges and which are therefore low-maintenance and inexpensive. This is especially advantageous for applications in which large quantities of thermal prints must be produced quickly. Accordingly, this technology has had success particularly in public transportation, busses, rail transportation, air travel, stadium and museum ticket kiosks, ticket sales for mass events, and parking receipt dispensers.

The environmental soundness of heat-sensitive recording materials of the type mentioned above has become increasingly significant. This (first) aspect has come under focus increasingly because certain color developers commonly found in these heat-sensitive recording materials are not readily or sufficiently biodegradable. For example, criticism has been aimed at the following compounds:
Bisphenol A (i.e., 2,2-bis(4-hydroxyphenyl)propan) and
Bisphenol S (i.e., 4,4'-dihydroxydiphenyl sulfone).

Apart from the challenge of providing heat-sensitive recording materials having color developers which are at least substantially biodegradable and therefore substantially ecologically sound, there is, regarding an additional (second) aspect, the continual challenge of optimizing the print density of these recording materials. In particular, this means adjusting a heat-sensitive recording material through addition of potentiating compounds such that the print density (i.e., the required jetness or degree of blackness) of the thermal print is increased compared to a heat-sensitive recording material that does not include potentiating compounds of this type. The person skilled in the art typically determines the print density of a thermal print by means of a densitometer.

A primary object of the present invention was to provide a composition for forming a visually discernible color and a heat-sensitive recording material which is produced with this composition and which has (a) color developers which are substantially environmentally sound and/or (b) have a dynamic print density and/or static print density which is modified (compared to an otherwise identically constituted reference composition; see comparison below), preferably in such a way that the maximum dynamic print density and/or maximum static print density is increased. Additionally, the composition and heat-sensitive recording material will be capable of being produced at a reasonable economic expense.

This object is met according to the invention through a composition for forming a visually discernible color which comprises, and is preferably made of, the following components:

a) one, two, three or more color developers (color developer compounds) comprising in each instance one, two, three, or more than three structural units of formula (I)

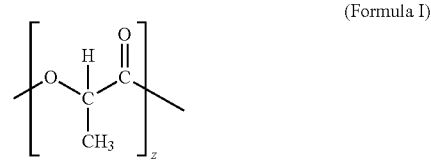

(Formula I)

where, in each of the structural units of formula (I), z means an integer greater than 1, wherein the respective meaning is independent of the meaning in further structural units of formula (I) which may possibly be present, b) one, two, three or more dye precursors (dye precursor compounds) for forming the visually discernible color through reaction with the color developer or color developers, and c) one, two or more compounds selected from the group comprising zinc salts, ammonium salts and zinc oxide, preferably selected from the group comprising zinc carbonate, zinc oxide, ammonium hydrogen sulfate, ammonium nitrate, ammonium hydrogen phosphate and zinc acetate.

Color developer compounds comprising in each instance one, two, three, or more than three structural units of formula (I) are generally completely biologically degradable and therefore have excellent environmental soundness. In addition, they are highly suitable for forming the visually discernible color through reaction with a dye precursor.

Surprisingly, it has been found through a series of conducted tests that a composition according to the invention (as defined above), i.e., comprising one, two or more compounds of components c) leads to an unexpected modification of the dynamic print density and/or static print density. The modification of these print densities is especially surprising because it was not expected that the compounds of component c) combined with the compounds of component a) (color developer) and component c) (dye precursor) would lead to such a modification of print densities.

However, a composition according to the invention (as defined above) in which the one, two or more compounds of component c) increase the maximum dynamic print density and/or the maximum static print density are preferred.

It was shown in some tests that, for example, conventional potentiating compounds such as fatty acid amides caused no increase, or at least no significant increase, in the maximum dynamic print density and/or maximum static print density.

The print density was determined by means of a densitometer in the thermal print, i.e., in the heat-sensitive recording material, after thermal printing.

The dynamic print density corresponds to the print densities determined in each instance by means of the densitometer with respect to the corresponding amounts of energy input per unit surface area (mJ/mm$^2$). The person skilled in the art usually enters the print densities determined for every input of energy in a diagram to plot a dynamic print density curve (abscissa: energy in mJ/mm$^2$; ordinate: print density).

On the other hand, the static print density corresponds to the print densities determined in each instance by means of the densitometer based on the corresponding temperatures (to which a heat-sensitive recording material is subjected for a defined length of time and under a defined pressing pressure). Again, the person skilled in the art usually prepares a diagram in which the print densities are plotted against the corresponding temperatures to show a static print density curve (abscissa: temperature; ordinate: print density).

In the respective diagrams, the maximum dynamic print density or maximum static print density corresponds to the highest values on the ordinate, i.e., the highest determined dynamic print densities or static print densities.

As has already been mentioned above, the print density is determined in the thermal print. In order to determine (or assess the increase in) the maximum dynamic print density or maximum static print density of a composition according to the invention (as described above, preferably a composition which is defined above as preferred), the composition is applied to a substrate (e.g., paper) under defined conditions in order to produce a defined heat-sensitive test recording material.

The maximum dynamic print density or maximum static print density is increased when the defined heat-sensitive test recording material has a higher maximum dynamic print density and/or a higher maximum static print density compared to the corresponding print density of a heat-sensitive reference recording material which has been printed and produced under identical parameters and contains no compound(s) of component c) with the composition and make-up remaining the same in other respects.

The print density is commonly indicated in optical density units (ODUs). A print density of 0.6 ODU is generally perceived by the human eye in the form of gray tones, while a print density of 1.1 ODU is generally perceived as black.

The structural unit of formula (I) refers to monomers of lactic acid which are esterified together. Lactic acid exists as levorotatory lactic acid (D-(−)-lactic acid or (R)-lactic acid) and as dextrorotatory lactic acid (L-(+)-lactic acid or (S)-lactic acid). Particularly preferred is a composition according to the invention (as described above, preferably a composition which is defined above as preferred) in which the structural unit of formula (I) is formed uniformly from dextrorotatory lactic acid monomers. In other embodiment forms, however, the structural unit of formula (I) is preferably formed uniformly from levorotatory lactic acid monomers or alternately from dextrorotatory and levorotatory lactic acid monomers.

Preferred is a composition according to the invention (as described above, preferably a composition which is defined above as preferred) in which, in each of the structural units of formula (I), z is an integer in the range of from 2 to 52, preferably in the range of from 2 to 25, and the respective meaning of z is independent of the meaning in further structural units of formula (I) which may possibly be present.

In a preferred composition according to the invention (as described above, preferably a composition which is defined above as preferred), color developers comprising structural units of formula (I) have a molar mass distribution in the range of from 140 to 5000 g/mol, preferably a molar mass distribution in the range of from 400 to 3800 g/mol, particularly preferably a molar mass distribution in the range of from 600 to 2000 g/mol. Color developers with a molar mass distribution of this type have an especially favorable ratio of negative charge (through the carboxyl group) to molecular weight. The color developers comprising structural units of formula (I) preferably make up 90 percent by weight or more in the (respective) indicated molar mass range.

The person skilled in the art will, of course, be familiar with suitable methods for determining the molar mass distribution. A preferred method is gel permeation chromatography (also, size exclusion chromatography).

Within the framework of the present invention, the person skilled in the art will usually determine through a series of simple comparative tests the exact total amount of compounds of component c) needed to adjust the required modification of the dynamic print density and/or static print density, preferably an increase in the maximum dynamic print density and/or maximum static print density. Preferred is a composition according to the invention (as described above, preferably a composition which is defined above as preferred) in which the total amount of component c) is in the range of from 7 to 33 percent by weight, advantageously in the range of from 12 to 25 percent by weight, preferably in the range of from 14 to 20 percent by weight with respect to the total mass of components a), b) and c).

Particularly preferred is a composition according to the invention (as described above, preferably a composition which is defined above as preferred) in which one, two or more compounds of component c) are selected from the group comprising organic zinc salts, inorganic zinc salts, inorganic ammonium salts and zinc oxide, wherein the total number of carbon atoms in the organic radicals of the organic zinc salts is preferably 10 or less, preferably 5 or less. The compounds of component c) are especially preferably selected from the group comprising zinc carbonate, zinc oxide, ammonium hydrogen sulfate and zinc acetate, preferably selected from the group comprising zinc carbonate, zinc oxide and zinc acetate, particularly preferably selected from the group comprising zinc oxide and zinc acetate.

According to a specific embodiment form, a composition according to the invention (as described above, preferably a composition which is defined above as preferred) in which one, two or more compounds of component c) are selected exclusively from the group of ammonium salts is preferred. The compounds selected from the group comprising ammonium hydrogen sulfate, ammonium nitrate and ammonium hydrogen phosphate are particularly preferred.

A composition according to the invention (as described above, preferably a composition which is defined above as preferred) which does not comprise zincstearate and/or zinc polysalicylate is particularly preferred.

Particularly preferred is a composition according to the invention (as described above, preferably a composition which is defined above as preferred) in which one, two, three, more than three, or all of the dye precursors is or are a compound selected from the group comprising 3-diethylamino-6-methyl-7-anilinofluoran, 3-dibutylamino-6- methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tolyl)amino-6-methyl-7-anilinofluoran, and 3-(N-ethyl-N-tetrahydrofuryl) amino-6-methyl-7-anilinofluoran. It is particularly preferable that a composition according to the invention includes at least one dye precursor from the above-mentioned group. 3-Dibutylamino-6-methyl-7-anilinofluoran—also known as ODB-2—is preferred.

In addition to these compounds specified as dye precursors, a preferred composition according to the invention also additionally includes one or more of the following near infrared-absorbent compounds:

3,6-bis(dimethylamino)fluorene-9-spiro-3'-(6'-dimethylaminophthalide), 3-diethylamino-6-dimethylaminofluorene-9-spiro-3'-(6'-dimethylaminophthalide), 3,6-bis(diethylamino)-fluorene-9-spiro-3'-(6'-dimethylaminophthalide), 3-dibutylamino-6-dimethylaminofluorene-9-spiro-3'-(6'-dimethylaminophthalide), 3-dibutylamino-6-diethylaminofluorene-9-spiro-3'-(6'-dimethylaminophthalide), 3,6-bis(dimethylamino)fluorene-9-spiro-3'-(6'-diethylaminophthalide), 3-diethylamino-6-dimethylaminofluorene-9-spiro-3'-(6'-diethylaminophthalide), 3-dibutylamino-6-dimethylaminofluorene-9-spiro-3'-(6'-diethylaminophthalide), 3,6-bis-(di-ethylamino)fluorene-9-spiro-3'-(6'-diethylaminophthalide), 3,6-bis-(dimethylamino)-fluorene-9-spiro-3'-(6'-dibutylaminophthalide), 3-dibutylamino-6-diethylaminofluorene-9-spiro-3'-(6'-diethylaminophthalide), 3-diethylamino-6-dimethylaminofluorene-9-spiro-3'-(6'-dibutylaminophthalide), 3,3-bis[2-(4-dimethylamino-phenyl)-2-(4-methoxyphenyl)-ethenyl]-4,5,6,7-tetrachlorophthalide.

Compounds of component b), preferably the dye precursors mentioned above, are suitable through reaction with the compound or compounds of component a) under suitable conditions to form the visually discernible color. The reaction between color developer and dye precursor that leads to the formation of the visually discernible color is a redox reaction, i.e., is characterized by the gain of electrons and the loss of electrons. Therefore, a composition according to the invention (as described above, preferably a composition which is defined above as preferred) in which the reaction of a compound of component b) with a compound of component a) for forming the visually discernible color is a redox reaction is particularly preferred. Without being disadvantageously bound by theory, it is assumed that an equilibrium is adjusted between reaction product (which is perceived as visually discernible color) and reactants (dye precursor and color developer). This equilibrium is presumably influenced by the addition of one or more compounds of component c). Compounds of component c) presumably shift the equilibrium in direction of the reaction product and accordingly preferably cause an increase in the maximum dynamic print density and/or maximum static print density.

The above-described reaction of the compounds of component b) with compounds of component a) is initiated when the energy needed for this reaction is applied. Preferred is a composition according to the invention (as described above, preferably a composition which is defined above as preferred) in which the composition is adjusted in such a way that the visually discernible color is formed when the temperature of the composition is increased.

Particularly preferred is a composition according to the invention (as described above, preferably a composition which is defined above as preferred) in which one, two, three, more than three, or all of the color developers is or are a compound of formula (Ia)

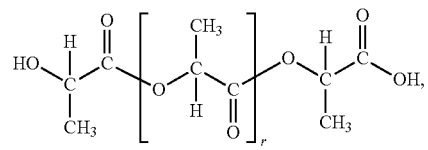

(Formula Ia)

wherein r in the compound of formula (Ia), independently of further color developers of formula (Ia) which may possibly be present, is an integer preferably independently of further color developers of formula (Ia) which may possibly be present and integer in the range of from 4 to 50.

Compounds of formula (Ia) have in each instance a free (i.e., not esterified) carboxyl group. However, some tests have shown that it is often advantageous to increase the quantity of usable (i.e., free) carboxyl groups by reacting compounds containing a plurality of structural units of formula (I) with a polybasic organic acid. Free carboxyl groups are often particularly important because they are significant in the reaction with the compounds of component b).

Particularly preferred is a composition according to the invention (as described above, preferably a composition which is defined above as preferred) comprising at least one dye precursor (i.e., at least one compound of component b)) and a combination of at least two different color developers (i.e., at least two different compounds of component a)), wherein each of the at least two different color developers is produced through conversion of an x-functional carboxylic acid with compounds containing structural units of formula (I), wherein z in each of the structural units of formula (I) means an integer greater than 1, wherein the respective meaning is independent of the meaning in further structural units of formula (I) which are present, wherein x (i.e., the number of acid functions in the x-functional carboxylic acid) is preferably two.

Particularly preferred is a composition according to the invention (as described above, preferably a composition which is defined above as preferred) in which one, two, three, more than three, or all of the color developers can be produced by I) conversion (accompanied by formation of an ester) of a x-functional carboxylic acid with compounds containing structural units of formula (I), wherein z in each of the structural units of formula (I) means an integer greater than 1, wherein the respective meaning is independent of the meaning in further structural units of formula (I) which may possibly be present, wherein x is two, three, or more than three.

Most preferred is a composition according to the invention (as described above, preferably a composition which is defined above as preferred) comprising two, three, or more than three color developers, wherein (I) a first color developer can be produced by conversion of an x-functional carboxylic acid with compounds containing structural units of formula (I), wherein z in each of the structural units of formula (I) means an integer greater than 1, wherein the respective meaning is independent of the meaning in further structural units of formula (I) which may possibly be present, wherein x is two, three, or more than three, and (II) a second color developer can be produced by conversion of a y-functional carboxylic acid with compounds containing structural units of formula (I), Conversion products according to I) of these particularly preferred divalent carboxylic acids are preferably those of formula (II):

wherein n, m and i in the compound of formula (II) are integers independently of one another and

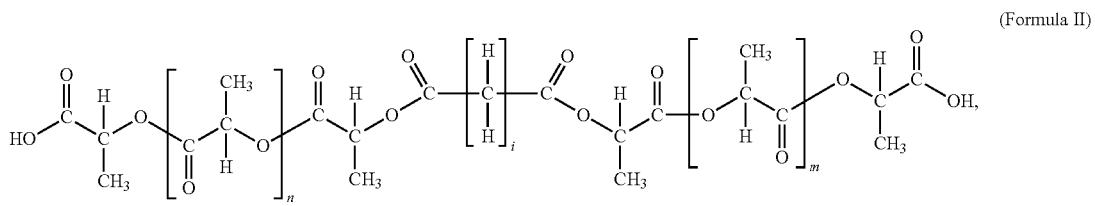

(Formula II)

wherein z in each of the structural units of formula (I) means an integer greater than 1, wherein the respective meaning is independent of the meaning in further structural units of formula (I) which may possibly be present, wherein y is three, or more than three, under the proviso that the x-functional carboxylic acid is not identical to the y-functional carboxylic acid, wherein y (i.e., the number of acid functions in the y-functional carboxylic acid) is preferably greater than x.

In this respect, it will be appreciated that the compounds containing structural units of formula (I) used to produce the respective color developers are suitable for conversion with the x-functional or y-functional carboxylic acid, e.g., because they carry free hydroxyl groups which can be used for esterifying the carboxylic acid.

independently of further color developers of formula (II) which may possibly be present; n and m are preferably integers in the range of from 1 to 50 independently of one another and independently of further color developers of formula (II) which may possibly be present, and i is an integer in the range of from 0 to 18 independently of n or m and independently of further compounds of formula (II) which may possibly be present. In a particularly preferred manner, i is an integer in the range of from 0 to 10. In a preferred compound of formula (II), i=0, i.e., the converted divalent organic acid is oxalic acid.

Compounds of formula (II) advantageously have two free carboxyl groups.

Particularly preferred is a composition according to the invention (as described above, preferably a composition which is defined above as preferred) in which one, two, three, more than three, or all of the color developers are a compound or compounds of formula (IIa)

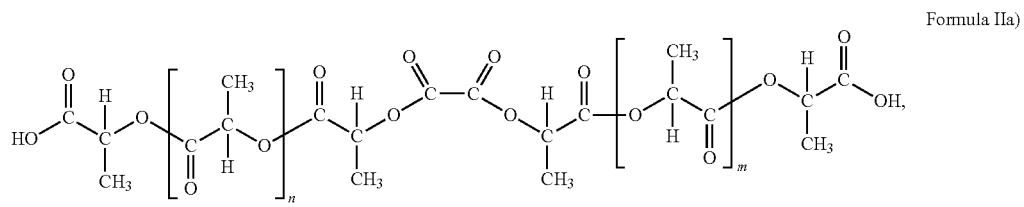

Formula IIa)

In these preferred instances, rheological properties can generally be adjusted in a specific manner. These rheological properties play an important role in the application of this composition according to the invention to a substrate for producing a heat-sensitive recording material. In addition, sensitivity with respect to the color-initiating treatment can in many cases be adjusted in this way.

Particularly preferred is a composition according to the invention (as described above, preferably a composition which is defined above as preferred) in which x=2 and one or more than one of the consequently divalent converted carboxylic acids are preferably selected from the group comprising oxalic acid, malonic acid, succinic acid, glutaric acid, adipic acid, pimelic acid, suberic acid, azelaic acid, sebacic acid, undecanedioic acid, dodecanedioic acid, tridecanoic diacid, tetradecanoic diacid, hexadecanoic diacid.

wherein n and m in the compound of formula (IIa) are integers independently of one another and independently of further color developers of formula (IIa) which may possibly be present, preferably integers in the range of from 1 to 50 independently of one another and independently of further color developers of formula (IIa) which may possibly be present. The two carboxyl groups of the oxalic acid group arranged in the center of the graphic formula are esterified in each instance with a hydroxyl group of each of a total of two compounds (each of which contains a structural unit of formula (I), wherein the value of z is n in the first structural unit of formula (I) and m in the second structural unit of formula (I)). It has proven advantageous in some tests that compounds of formula (II) and compounds of formula (IIa) have two free carboxyl groups.

Preferred in other cases is a composition according to the invention (as described above, preferably a composition which is defined above as preferred) in which the divalent acids are selected from the group comprising maleic acid, fumaric acid, malic acid, tartaric acid, glutamic acid, aspartic acid, phthalic acid, isophthalic acid, terephthalic acid.

Conversion products according to II) are preferably those of formula (III):

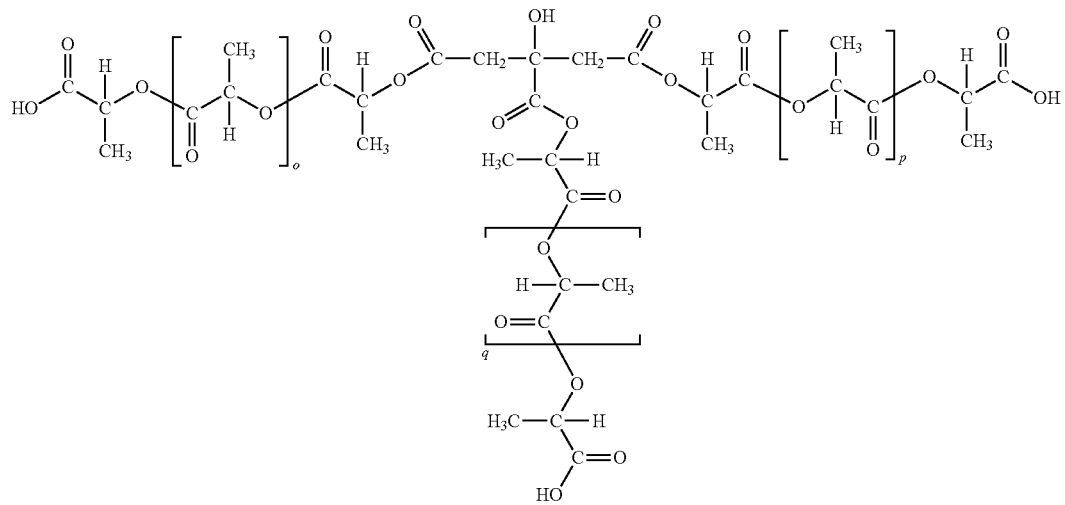
(Formula III)

wherein o, p and q in the compound of formula (III) are integers independently of one another and independently of further color developers of formula (III) which may possibly be present, preferably integers in the range of from 1 to 50 independently of one another and independently of further color developers of formula (III) which may possibly be present.

Compounds of formula (III) contain converted citric acid (as trivalent organic acid), wherein each of the three carboxyl groups is esterified with a hydroxyl group and particularly preferred for use in a composition according to the invention (as described above, preferably a composition which is defined above as preferred).

Compounds of formula (III) advantageously have three free carboxyl groups in each instance.

Preferred compositions according to the invention (as described above, preferably a composition which is defined above as preferred) comprise one, two, or more than two compounds which are selected from the group comprising compounds of formula (Ia), compounds of formula (II) and compounds of formula (III) (as described above, respectively).

Particularly preferred is a composition according to the invention (as described above, preferably a composition which is defined above as preferred) in which one, two, three, more than three, or all of the color developers are i) a compounds of formula (Ia)

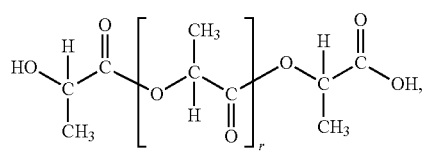
(Formula Ia)

wherein r in the compound of formula (Ia), independently of further color developers of formula (Ia) which may possibly be present, is an integer preferably independently of further color developers of formula (Ia) which may possibly be present an integer in the range of from 4 to 50,
and/or
ii) a compound of formula (II) as defined above, for example, a compound of formula (IIa)

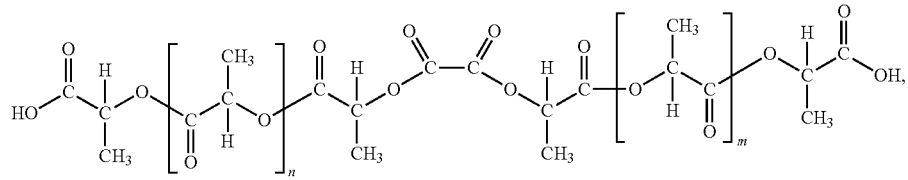
(Formula IIa)

wherein n and m in the compound of formula (II) or formula (IIa) are integers independently of one another and independently of further color developers of formulas (II) or (IIa) which may possibly be present, preferably integers in the range of from 1 to 50 independently of one another and independently of further color developers of formulas (II) or (IIa) which may possibly be present, and/or
iii) a compound of formula (III)

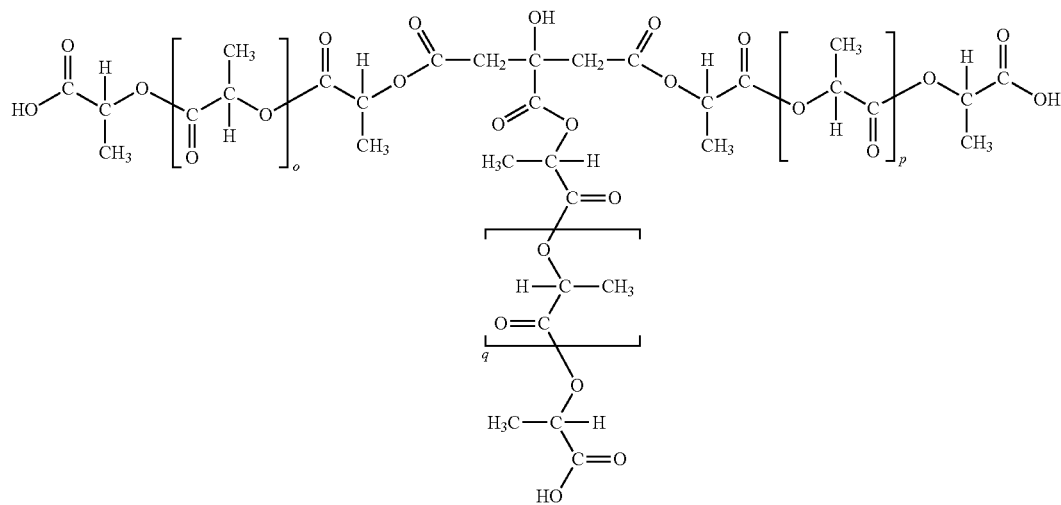

(Formula III)

wherein o, p and q in the compound of formula (III) are integers independently of one another and independently of further color developers of formula (III) which may possibly be present, preferably integers in the range of from 1 to 50 independently of one another and independently of further color developers of formula (III) which may possibly be present.

The color developers described above (preferably described as preferred) are preferably combined with preferred compounds of component c).

In some preferred cases, a composition according to the invention contains, in addition to at least one compound of component a) (i.e., a color developer as described above, preferably a color developer which is described above as preferred), one or more additional color developers which are not compounds of component a) (and also not compounds of components b) and c)). These color developers and additional color developers are preferably selected from the group comprising 2,2-bis(4-hydroxyphenyl)propan, 4,4'-dihydroxydiphenyl sulfone, N-(p-toluenesulphonyl)-N'-3-(p-toluenesulphonyloxyphenyl)urea and 4-[(4-(1-methyl-ethoxy)phenyl)sulfonyl]phenol.

However, most preferable is a composition according to the invention (as described above, preferably a composition which is defined above as preferred) in which all of the color developers contained in the composition contain one, two, three, or more than three structural units of formula (I) as defined above (preferably defined as preferred). This means that those compositions according to the invention that are most preferred are those comprising (in addition to one or more than one compound of component c) and one or more than one compound of component b)) a compound of component a) or a combination of a plurality of compounds (differing from one another) of component a) (compounds as described above, preferably defined above as preferred), wherein only this compound (these compounds) of component a) is (are) suitable as color developers. Additional color developers which do not contain compounds of component a) are not contained in a most preferred composition according to the invention of this kind.

In addition to compounds of components a), b) and c), a composition according to the invention (as described above, preferably a composition which is defined above as preferred) preferably additionally comprises optional compounds. These optional compounds are preferably selected from the group comprising binders, sensitizers, slip agents, release agents and pigments. Particularly preferred is a composition according to the invention (as described above, preferably a composition which is defined above as preferred) made of compounds of components a) and b) and c) and additionally of optional compounds. Most preferred is a composition according to the invention made of compounds of components a) and b) and c) and one or more compounds selected from the group comprising binders, sensitizers, slip agents, release agents and pigments. None of these optional compounds shall have any compounds of components a), b) or c).

Preferred is a composition according to the invention (as described above, preferably a composition which is defined above as preferred) additionally comprising one, two or more binders, wherein the one binder of the one or more than one binders is preferably selected from the group comprising polyvinyl alcohol, ethylene vinyl alcohol copolymer and a combination of polyvinyl alcohol and ethylene vinyl alcohol copolymer.

Further suitable binders are, for example, water-soluble binders such as starch, hydroxyethylcellulose, methyl cellulose, carboxy methyl cellulose, gelatins, casein, polyvinyl alcohols, modified polyvinyl alcohols, ethylene vinyl alcohol copolymers, sodium polyacrylates, acrylamide/acrylate copolymers, acrylamide/acrylate/methacrylate terpolymers, and alkali salts of styrene maleic acid anhydride copolymers or ethylene maleic acid anhydride copolymers, wherein the binders can be used alone or in combination with one another; also, water-insoluble latex binders such as styrene-butadiene copolymers, acryl nitrile butadiene copolymers, and methyl acrylate butadiene copolymers can be used as binders. Polyvinyl alcohol, ethylene vinyl alcohol copolymers, and polyvinyl alcohol in combination with ethylene vinyl alcohol copolymer are particularly preferred binders and are preferably are incorporated in the composition in a range of from 10 to 20 percent by weight based on the total dry weight of the composition according to the invention.

Suitable sensitizers which can be additionally contained in a composition according to the invention (as described above, preferably a composition which is defined above as preferred) are, for example, 2-(2H-benzotriazol-2-yl)-p-cresol, benzyl-p-benzyloxybenzoate, methylolstearamide, stearic acid amide, p-benzylbiphenyl, 1,2-di(phenoxy)ethane, 1,2-di(m-methylphenoxy)ethane, m-terphenyl, dibenzyloxalate, benzyl naphthyl ether, dimethyl terephtalate, and diphenyl sulfone, wherein methylolstearamide and, in particular, stearic acid amide and/or dimethyl terephtalate are preferred in certain embodiment forms of the composition according to the invention. These additional sensitizers (insofar as they are used) are preferably used in a total quantity such that the dynamic print density and/or static print density is additionally modified, particularly preferably the maximum dynamic print density and/or maximum static print density are/is additionally increased. The person skilled in the art will generally determine the amount of additional sensitizers suitable for this purpose through a series of simple comparison tests.

In other embodiment forms, a composition according to the invention (as described above, preferably a composition which is defined above as preferred) preferably comprises no more than one additional sensitizer, preferably no additional sensitizers.

Slip agents and release agents serve to improve the slip properties of a heat-sensitive recording material (preferably produced from a composition according to the invention) with respect to a thermal head of a thermal printer and to prevent excessive wear of the thermal head. Preferred slip agents and release agents in a composition according to the invention (as described above, preferably a composition which is defined above as preferred) are, for example, metal salts of higher fatty acids (e.g., calcium stearate) and waxes (e.g., paraffin, oxidized paraffin, polyethylene, polyethylene oxide, stearic acid amide and castor wax).

Suitable pigments in a composition according to the invention (as described above, preferably a composition which is defined above as preferred) are preferably inorganic pigments (e.g., aluminum (hydr)oxide, silicic acid, and calcium carbonate). Aluminum (hydr)oxide is a particularly preferred pigment.

The present invention is also directed to the use of one, or more than one, compound(s) selected from the group comprising zinc salts, ammonium salts and zinc oxide, preferably selected from the group comprising zinc carbonate, zinc oxide, ammonium hydrogen sulfate, ammonium nitrate, ammonium hydrogen phosphate and zinc acetate for modifying the dynamic print density and/or the static print density, preferably for increasing the maximum dynamic print density and/or the maximum static print density of a mixture comprising one, two, three or more color developers and one, two, three or more dye precursors for forming a visually discernible color by reaction with the color developer or color developers.

Preferred is a use according to the invention (as described above) for modifying the dynamic print density and/or the static print density, preferably for increasing the maximum dynamic print density and/or the maximum static print density of a mixture comprising a) one, two, three or more color developers, comprising in each instance one, two, three, or more than three structural units of formula (I)

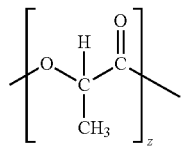

(Formula I)

wherein z, in each of the structural units of formula (I), z means an integer greater than 1, wherein the respective meaning is independent of the meaning in further structural units of formula (I) which may possibly be present, and b) one, two, three or more dye precursors for forming a visually discernible color through reaction with the color developer or color developers The composition according to the invention (as described above, preferably a composition which is defined above as preferred) described above is generally excellently suited as a coating mixture for applying to a substrate, i.e., the composition according to the invention is suitable for and is provided for producing a color-reactive recording material.

Therefore, the present invention is also generally directed to a color-reactive recording material with a substrate and a color-reactive recording layer formed thereon, this color-reactive recording layer comprising or being made of a composition according to the invention (as described above, preferably a composition which is defined above as preferred). A heat-sensitive recording material is particularly preferred as color-reactive recording material.

Alternatively, however, a color-reactive recording material can also be a pressure-sensitive recording material, this pressure-sensitive recording material containing the composition according to the invention either in an individual layer or in two separate layers. In this case, the compounds of component b) are in encapsulated form.

Therefore, the present invention is also directed to the use of a composition according to the invention (as described above, preferably a composition which is defined above as preferred) for producing a heat-sensitive recording material, preferably for producing a heat-sensitive recording material according to the invention (such as is described in the following, preferably a recording material such as is described in the following as preferred).

Accordingly, the present invention is specifically directed to a heat-sensitive recording material made of or comprising (preferably comprising) a substrate and a heat-sensitive recording layer, wherein the heat-sensitive recording layer comprises or is made from (preferably is made from) a composition according to the invention. Consequently, the statements made above regarding the compositions according to the invention (preferably the statements regarding the preferred compositions) accordingly also apply in a corresponding manner to the heat-sensitive recording materials according to the invention.

In its simplest embodiment form, a heat-sensitive recording material of the type mentioned above comprises a substrate and a heat-sensitive recording layer, the heat-sensitive recording layer being made of a composition according to the invention containing in each instance at least one compound of components a), b) and c). This heat-sensitive recording material is generally adapted in such a way that (i) the visually discernible color is formed when the temperature is increased and (ii) the dynamic print density and/or the static print density are/is modified, preferably the maximum dynamic print density and/or maximum static print density are/is increased (compared to a comparison recording material or reference recording material such as has already been described above).

Particularly preferred is a heat-sensitive recording material according to the invention (as described above) in which all of the color developers contained in the heat-sensitive recording layer contain one, two, three, or more than three structural units of formula (I) as defined in the composition according to the invention (as described above, preferably a composition which is defined above as preferred). This means that a preferred heat-sensitive recording material according to the invention comprises (in addition to one or more than one compound of component c) and one or more than one compound of component b)) either only one individual color developer which is a compound of component a) or comprises a combination of a plurality of color developers, i.e., a combination of compounds of component a). Additional color developers which are not compounds of component a) are not contained in a heat-sensitive recording layer of this type.

Particularly preferred is, further, a heat-sensitive recording material according to the invention (as described above, preferably a recording material which is defined above as preferred) in which the heat-sensitive recording layer comprises one, two or more binders, wherein the one binder of one or more than one binders is preferably selected from the group comprising polyvinyl alcohol, ethylene vinyl alcohol copolymer and a combination of polyvinyl alcohol and ethylene vinyl alcohol copolymer. It is preferable that the total weight of the binders is in a range of from 10 to 20 percent by weight based on the total weight of the heat-sensitive recording layer.

As has already been stated above, a preferred composition according to the invention comprises one or more than one pigment. The particularly preferred pigment, aluminum (hydr)oxide, is preferably incorporated in the recording layer in a quantity of from 0 to 45 percent by weight, most preferably in a quantity of from 10 to 40 percent by weight, based on the total weight of the recording layer.

Preferred is a heat-sensitive recording material according to the invention (as described above, preferably a recording material defined above as preferred) in which the heat-sensitive recording material has one or more (preferably one) pigment-containing intermediate layer(s) arranged between the substrate and the heat-sensitive recording layer, and the construction of the intermediate layer or intermediate layers differs from that of the substrate and from that of the heat-sensitive recording layer.

The pigments of the intermediate layer(s) can be organic hollow pigments as well as inorganic pigments, the latter preferably being selected from the group comprising natural kaolin, calcined kaolin, silicon oxide (here, particularly bentonite), calcium carbonate and aluminum hydroxide (here, particularly boehmite). On the one hand, an intermediate layer of this type can contribute in a positive manner to the leveling of the surface of the substrate to be coated so that the required amount of coating composition to be applied for the heat-sensitive recording layer is reduced. For this reason, leveling coating devices such as, e.g., roller coating units, knife coating units, and (roll) doctor coating units are suitable for applying the pigmented intermediate layer. On the other hand, the pigments of this intermediate layer can absorb the wax constituents (if any) of the heat-sensitive recording layer which are liquefied by the heating effect during formation of the print image and accordingly promote a more reliable and faster functioning of the heat-induced recording. The basis weight of the pigment-containing intermediate layer is preferably between 5 $g/m^2$ and 20 $g/m^2$ or particularly preferably between 7 $g/m^2$ and 11 $g/m^2$.

Additionally preferred is a heat-sensitive recording material according to the invention (as described above, preferably a recording material defined above as preferred) in which the heat-sensitive recording layer is entirely or partially covered with a protective layer. The protective layer can serve particularly as protection against scratches and/or to protect the heat-sensitive recording layer arranged beneath it from organic solvents as well as from oils, fats, water and plasticizers.

The substrates needed for producing heat-sensitive recording materials according to the invention are very diverse. Particularly preferred is a heat-sensitive recording material according to the invention (as described above, preferably a recording material defined above as preferred) in which the substrate is selected from the group comprising paper, film, plastic and foils.

Although the substrate in the present heat-sensitive recording material according to the invention is not limited to paper, paper—and in this case especially a coating base paper that has not been surface-treated—is the most commercially accepted substrate, also as regards good environmental soundness due to favorable recyclability. Therefore, coating base paper that has not been surface-treated is particularly preferred. By "coating base paper that has not been surface-treated" is meant a coating base paper that has not been treated in a size press or in a coating apparatus. Foils, for example, of polypropylene, polyolefin and polyolefin-coated papers are also possible as substrate for the invention without this embodiment having an exclusive character, i.e., without being limited to substrates of this type.

Particularly preferred is a heat-sensitive recording material according to the invention (as described above, preferably a recording material defined above as preferred) in which the basis weight of the heat-sensitive recording layer on the substrate is between 2 $g/m^2$ and 9 $g/m^2$, preferably between 2.2 $g/m^2$ and 7 $g/m^2$.

The present invention is also directed to a process for the production of a heat-sensitive recording material according to the invention (as described above, preferably a recording material defined above as preferred) comprising the following steps:

producing or providing a composition according to the invention (as described above, preferably a composition which is defined above as preferred)

producing or providing a substrate (as described above, preferably a substrate which is defined above as preferred)

coating the substrate with the composition, wherein the step of coating is preferably carried out by means of a coating apparatus, which coating apparatus is preferably selected from the group comprising roll doctor coating units, knife coating units, curtain coaters and air brushes.

Preferred is a process according to the invention (as described above, preferably a process which is defined above as preferred) in which one or more intermediate layers and/or protective layers are applied in addition.

The data given in the present text respecting basis weight and percent by weight relate in each instance to bone dry parts by weight.

The present invention will be described more fully in the following referring to examples:

EXAMPLES

1. Compositions

To determine the maximum dynamic print density or maximum static print density of selected compositions according to the invention or of heat-sensitive recording materials according to the invention produced therefrom, two comparison compositions (reference compositions R1 and R2) and four additional compositions according to the invention (Z1 to Z4) were produced in a first work step. The constituents of each individual composition are listed in Table 1. The amounts specified therein are dry weight parts based on 1 dry weight part of the dye precursor 3-dibutylamino-6-methyl-7-anilinofluoran. The amounts of zinc oxide, zinc acetate, zinc carbonate and ammonium hydrogen sulfate correspond to approximately equimolar amounts of zinc compounds.

TABLE 1

| Constituent | Dry Weight Parts (Bone Dry Weight Parts) | | | | | |
|---|---|---|---|---|---|---|
| | R1 | R2 | Z1 | Z2 | Z3 | Z4 |
| Compound of component a) | 3 | 3 | 3 | 3 | 3 | 3 |
| Polyvinyl alcohol | 1 | 1 | 1 | 1 | 1 | 1 |
| 3-Dibutylamino-6-methyl-7-anilinofluoran | 1 | 1 | 1 | 1 | 1 | 1 |
| N-hydroxymethyloctadecanamide | — | 1 | — | — | — | — |
| Zinc oxide | — | — | 1 | — | — | — |
| Zinc acetate | — | — | — | 2.70 | — | — |
| Zinc carbonate | — | — | — | — | 1.54 | — |
| Ammonium hydrogen sulfate | — | — | — | — | — | 1 |

2. Heat-Sensitive Recording Materials

In a second work step, the compositions indicated above were processed to form a coating composition and subsequently applied in each instance to a paper (substrate) by laboratory roller coating so that six different heat-sensitive recording materials resulted. A pre-coated 75 g/m² base paper was used as substrate. The pre-coating was made up chiefly of natural kaolin. Paper that was coated with compositions R1 and R2 resulted in two reference recording materials (Example 1 and Example 2); compositions Z1 to Z4 resulted in an additional four heat-sensitive recording materials according to the invention (Example 3 to Example 6). Every composition was applied such that an identical amount of dye precursor (i.e., 3-dibutylamino-6-methyl-7-anilinofluoran) was applied per m² of substrate in each instance.

3. Determination of the Maximum Print Densities

In order to determine the maximum print densities of Examples 1 to 6, (i) dynamic and (ii) static print density curves were prepared and evaluated.

3.1 Maximum Dynamic Print Density:

In order to determine the maximum dynamic print density for each of the Examples 1 to 6, black-and-white checkerboard thermal test prints were prepared with an Atlantek 400 by Printex (USA), and the heat-sensitive recording materials (Example 1 to Example 6) were printed at an energy setting in the range of from 3 to 16 mJ/mm².

Each thermal test print was subsequently analyzed by means of a Gretag MacBeth D19C NB/U densitometer. The measurements (i.e., print density data in ODU) obtained by means of the densitometer were plotted against the corresponding energy inputs and resulted in a dynamic print density curve. The maximum dynamic print density Dmax (dynamic) determined for each example (i.e., the highest value reached on the Y-axis in the dynamic print density curve) is shown in Table 2.

TABLE 2

| | Example 1 (R1) | Example 2 (R2) | Example 3 (Z1) | Example 4 (Z2) | Example 5 (Z3) | Example 6 (Z4) |
|---|---|---|---|---|---|---|
| $D_{max}$ (dynamic) | 0.42 | 0.33 | 0.60 | 0.81 | 0.53 | 0.46 |

The results listed in Table 2 show that the maximum dynamic print density of heat-sensitive recording materials according to the invention (i.e., of Examples 3 to 6) is increased compared to the reference recording materials (Example 1 and Example 2). A comparison of the maximum dynamic print densities of the recording materials in Examples 1 to 4, for example, shows an increase in the maximum dynamic print density in the recording material of Example 4 (containing zinc acetate) by a factor of approximately 2 compared to the reference material (Example 1) which does not contain a compound of component c).

(Remark: Results of similar quality were obtained for a large number of preferred compounds of component a); only one exemplary result is shown above for the sake of simplicity).

3.2 Maximum Static Print Density:

In order to determine the maximum static print density for each of the Examples 1 to 6, thermal test prints were prepared with a heat gradient type device by Toyoseiki (Japan). The thermal test prints were prepared at temperatures in the range of from 65 to 140° C. Every thermal test print was prepared with a contact time of 2 seconds and at a pressing pressure of 0.3 mPa.

Each thermal test print was subsequently analyzed by a densitometer of the type described above (3.1). The measurements (i.e., print density data in ODU) obtained were plotted against the corresponding temperatures and resulted in a static print density curve. The maximum static print density Dmax (static) determined for each example (i.e., the highest value reached on the Y-axis in the static print density curve) is shown in Table 3.

TABLE 3

| | Example 1 (R1) | Example 2 (R2) | Example 3 (Z1) | Example 4 (Z2) | Example 5 (Z3) | Example 6 (Z4) |
|---|---|---|---|---|---|---|
| $D_{max}$ (static) | 0.15 | 0.20 | 0.61 | 0.85 | 0.53 | 0.70 |

The results listed in Table 3 likewise show that the maximum static print density of heat-sensitive recording materials according to the invention (i.e., of Examples 3 to 6) is increased compared to the reference recording materials (Example 1 and Example 2). A comparison of the maximum static print densities of the recording materials in Examples 1 to 4, for example, shows an even more than five-fold increase in the maximum static print density in the recording material of Example 4.

(Remark: Results of similar quality were obtained for a large number of preferred compounds of component a); only one exemplary result is shown above for the sake of simplicity).

Further, the heat-sensitive recording materials according to the invention (Examples 3 to 6) show that both the maximum dynamic print density and the maximum static print density are increased compared with the reference material (Example 1).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A composition for forming a visually discernible color comprising:
a) one, two, three or more color developers comprising in each instance one, two, three, or more than three structural units of formula (I)

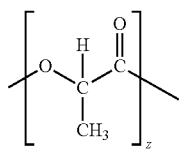

(Formula I)

wherein, in each of the structural units of formula (I), z means an integer greater than 1, wherein the respective meaning is independent of the meaning in further structural units of formula (I) which may be present;
b) one, two, three or more dye precursors for forming the visually discernible color through reaction with the color developer or color developers; and
c) one, two or more compounds selected from the group comprising zinc salts, ammonium salts and zinc oxide.

2. The composition according to claim 1, wherein the one, two or more compounds of component c) increase the maximum dynamic print density and/or the maximum static print density.

3. The composition according to claim 1, wherein the total amount of component c) is in the range of from 7 to 33 percent by weight with respect to the total mass of components a), b) and c).

4. The composition according to claim 1, wherein one, two, three, more than three, or all of the dye precursors is or are a compound selected from the group comprising 3-diethylamino-6-methyl-7-anilinofluoran, 3-dibutylamino-6-methyl-7-anilinofluoran, 3-(N-methyl-N-propyl)amino-6-methyl-7-anilinofluoran, 3-(N-ethyl-N-isoamyl)amino-6-methyl-7-anilinofluoran, 3-(N-methyl-N-cyclohexyl)amino-6-methyl-7-anilinofluoran, 3-(N-ethyl-N-tolyl)amino-6-methyl-7-anilinofluoran, and 3-(N-ethyl-N-tetrahydrofuryl)amino-6-methyl-7-anilinofluoran.

5. The composition according to claim 1, wherein the composition is adapted in such a way that the visually discernible color is formed when the temperature of the composition is increased.

6. The composition according to claim 1, wherein one, two, three, more than three, or all of the color developers is/are made by
(I) conversion of an x-functional carboxylic acid with compounds containing structural units of formula (I), wherein z in each of the structural units of formula (I) means an integer greater than 1, wherein the respective meaning is independent of the meaning in further structural units of formula (I) which may be present; and wherein x is two, three, or more than three.

7. The composition according to claim 1, comprising two, three, or more than three color developers, wherein
(I) a first color developer is made by conversion of an x-functional carboxylic acid with compounds containing structural units of formula (I), wherein z in each of the structural units of formula (I) means an integer greater than 1, wherein the respective meaning is independent of the meaning in further structural units of formula (I) which may be present; wherein x is two, three, or more than three; and wherein
(II) a second color developer is made by conversion of a y-functional carboxylic acid compounds containing structural units of formula (I), wherein z in each of the structural units of formula (I) means an integer greater than 1, wherein the respective meaning is independent of the meaning in further structural units of formula (I) which may be present; wherein y is three, or more than three,
with the proviso that the x-functional carboxylic acid is not identical to the y-functional carboxylic acid.

8. The composition according to claim 1, wherein all of the color developers contained in the composition contain one, two, three, or more than three structural units of formula (I).

9. The composition according to claim 1, additionally comprising one, two or more binders, wherein the one binder of the one or more than one binders is selected from the group comprising polyvinyl alcohol, ethylene vinyl alcohol copolymer and a combination of polyvinyl alcohol and ethylene vinyl alcohol copolymer.

10. A heat-sensitive recording material comprising:
a substrate and a heat-sensitive recording layer; and
wherein the heat-sensitive recording layer comprises a composition according to claim 1.

11. The heat-sensitive recording material according to claim 10, wherein all of the color developers contained in the heat-sensitive recording layer contain one, two, three, or more than three structural units of formula (I).

12. A process for the production of a heat-sensitive recording material comprising the following steps:
providing a composition according to claim 1;
providing a substrate; and
coating the substrate with the composition;

wherein the step of coating is preferably carried out by a coating apparatus, wherein the coating apparatus is selected from the group comprising a roll doctor coating unit, knife coating unit, curtain coater and air brush.

13. The composition according to claim 1, wherein the total amount of component c) is in the range of from 12 to 25 percent by weight with respect to the total mass of components a), b) and c).

14. The composition according to claim 1, wherein the total amount of component c) is in the range of from 14 to 20 percent by weight with respect to the total mass of components a), b) and c).

15. The composition according to claim 1, comprising two, three, or more than three color developers, wherein
   (I) a first color developer is made by conversion of an x-functional carboxylic acid with compounds containing structural units of formula (I), wherein z in each of the structural units of formula (I) means an integer greater than 1, wherein the respective meaning is independent of the meaning in further structural units of formula (I) which may be present; wherein x is two, three, or more than three; and wherein
   (II) a second color developer is made by conversion of a y-functional carboxylic acid compounds containing structural units of formula (I), wherein z in each of the structural units of formula (I) means an integer greater than 1, wherein the respective meaning is independent of the meaning in further structural units of formula (I) which may be present; wherein y is three, or more than three,
      with the proviso that the x-functional carboxylic acid is not identical to the y-functional carboxylic acid; and wherein y is greater than x.

16. A method of modifying the dynamic print density and/or the static print density, particularly for increasing the maximum dynamic print density and/or the maximum static print density of a mixture of one, two, three or more color developers and one, two, three or more dye precursors for forming a visually discernible color, said method comprising the step of:
   reacting one or more than one compound selected from the group comprising zinc salts, ammonium salts and zinc oxide with the color developer or color developers; wherein the one, two, three or more color developers, comprise in each instance one, two, three, or more than three structural units of formula (I)

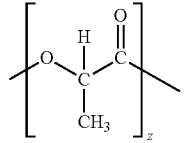

(Formula I)

wherein, in each of the structural units of formula (I), z means an integer greater than 1, wherein the respective meaning is independent of the meaning in further structural units of formula (I) which may be present.

17. The method according to claim 16, wherein the zinc salts and/or ammonium salts are selected from the group comprising zinc carbonate, zinc oxide, ammonium hydrogen sulfate, ammonium nitrate, ammonium hydrogen phosphate and zinc acetate.

* * * * *